United States Patent
Gunasekera

(12) 
(10) Patent No.: US 6,803,672 B2
(45) Date of Patent: Oct. 12, 2004

(54) AUTOMATIC VEHICLE VENTILATION DEVICE

(76) Inventor: Darren Aster Gunasekera, 17, Jalan TP 7/7 Sime-Uep Industrial Park, Section 26, Shah Alam 40400, Selangor (MY), 40400

( * ) Notice: Subject to any disclaimer, the term of this patent is extended or adjusted under 35 U.S.C. 154(b) by 226 days.

(21) Appl. No.: 09/984,899

(22) Filed: Oct. 31, 2001

(65) Prior Publication Data

US 2002/0066281 A1 Jun. 6, 2002

(30) Foreign Application Priority Data

Nov. 1, 2000 (MY) .................................... PI 2000 5095

(51) Int. Cl.⁷ .................................................. B60L 1/00
(52) U.S. Cl. ........................ 307/9.1; 307/10.7; 62/3.7; 180/68.1; 165/41
(58) Field of Search ............................. 307/9.1, 10.7, 307/10.1; 62/3.7

(56) References Cited

U.S. PATENT DOCUMENTS 4,308,994 A * 1/1982 Perhats .................. 237/12.3 B
6,158,225 A * 12/2000 Muto et al. .................. 62/3.7

* cited by examiner

Primary Examiner—Robert DeBeradinis
(74) Attorney, Agent, or Firm—Lowe Hauptman Gilman & Berner, LLP

(57) ABSTRACT

A device is disclosed for reducing overheating in a passenger compartment of a parked vehicle. The device has a temperature sensor, a temperature comparator, and a control system in electrical communication with the comparator for controlling the actuation and operation of an existing air conditioner fan within the vehicle. The control system incorporates a power supply management arrangement designed to draw energy in pulses from a battery unit of the vehicle to energize the motor when the temperature in the passenger compartment exceeds a predetermined level, and to cease drawing energy when the temperature falls below the predetermined level.

20 Claims, 7 Drawing Sheets

AUTOMATIC VEHICLE VENTILATION DEVICE

The present invention relates generally to a vehicle ventilation device, and more particularly to an automatic ventilation device for controlling the internal temperature of a parked vehicle to prevent it from being overheated on hot days.

BACKGROUND OF THE INVENTION

The operator and passengers of a vehicle often experience considerable discomfort when they enter a vehicle that has been parked under the hot sun or in a non-cooled garage during hot weather. Although air conditioning technology to cool the passenger compartment is well known, it normally takes some time before the air conditioning is effective to reduce the internal temperature of the compartment to a comfortable level and to cool such components as the steering wheel and hand brake to the point that they can be touched without discomfort. In particularly hot conditions the temperature may reach at least 70° C. Such excessively high temperatures not only cause personal discomfort but also may cause damage to interior trim, plastic fixtures and other interior components of the vehicle and to articles that have been left in the vehicle.

Many devices have been proposed for overcoming this problem but none have worked effectively or become popular.

One form of such device includes a cooling unit consisting of a cooling chamber with at least one insulated wall having on opposite sides, a heat sink and a cooling block having there between a thermoelectric chip. The device also includes an air intake conduit, a cool air conduit, and an exhaust conduit and means for supplying power from the vehicle battery to the cooling unit.

A further device is intended to be attached to the side window of the vehicle using an interfacing fixture that is attached between the door frame and the side window. The device includes a housing that has an air outlet port, a DC motor, a centrifugal fan, a voltage polarity switch and a temperature control module. The temperature control module consists of first and second heat exchangers and a Peltier-effect thermoelectric element. Electric power is supplied to the device through a control unit that takes power from the vehicle battery at a pre-selected time.

In yet another approach, the device comprises at least one thermal conductor containing a phase-change working substance for cooling the overheated passenger compartment. The thermal conductor has three sections, namely, an evaporator section located in the vehicle compartment, a condenser section located outside the vehicle and an adiabatic section there between. The heat in the vehicle compartment causes evaporation of the working substance in the evaporator section, which draws heat from the compartment. The resulting difference in vapor pressure between the evaporator section and the condenser section drives the vapor-phase working substance from the evaporator section through the adiabatic section to the condenser section where it condenses, thus releasing the latent heat of condensation to the ambient air. The evaporator section is normally attached to the inner surface of the roof panel and the condenser section is mounted on top of the roof panel.

All these prior devices are relatively complicated and expensive and, especially for the third approach, require modification of the structure of the vehicle. A further problem associated with the powered devices is that power usage is not particularly efficient, which results in battery drain, especially when the device is directly connected to the battery of the vehicle.

An alternative solution to overcome the inconvenience caused by overheating of the passenger compartment of a parked vehicle would therefore be desirable.

SUMMARY OF THE INVENTION

This invention provides a device for reducing overheating of the passenger compartment of a parked vehicle, which makes use of existing components of the vehicle, for example, the air conditioner fan, its motor and the associated ducting so as to minimize the number of components required and which incorporates a power management system to reduce or eliminate problems of battery drain.

According to the invention a device for reducing overheating in the passenger compartment of a parked vehicle comprises a temperature sensor, a temperature comparator and a control means, preferably micro-processor based, in electrical communication with the comparator for controlling the actuation and operation of an existing air conditioner fan of a vehicle; the control means incorporating a power supply management means designed to draw energy in pulses from a battery unit of the vehicle to energise the motor when the temperature in the passenger compartment exceeds a pre-determined level, and to cease drawing energy when the temperature falls below the predetermined level, Preferably, the device incorporates a switch that allows the device to operate only when the ignition of the vehicle is turned off. The switch is preferably designed to operate automatically when the ignition of the vehicle is turned off.

Since the device can only operate efficiently when the air conditioner inlet vents are open, when the vehicle has electrically operated air conditioner vents, the control means preferably is designed to open the inlet vents when it is switched on. If the vehicle does not have electrically operated air conditioner vents, the device may be associated with an attachment for converting the inlet ducts to electrical operation.

The device is provided with connections, preferably jack connections for connecting it directly or indirectly to the battery of a vehicle and to the motor of the ventilator fan and to by-pass the air conditioner fan speed controller. It preferably also has connections to the inlet vents of the vehicle.

The control means preferably employs a pulse width modulation technique to control energy usage from the battery. It is preferred that the pulse frequency of a pulse width modulator is set above the normal audible range and below the RF frequency so as to avoid human discomfort and also to avoid possible frequency related interference to the vehicle including its electronic components and the related devices. It is preferably set at 24 KHz.

The use of a pulse width modulation technique by which the device draws power from the battery for a predetermined time and then automatically ceases to draw power for a minimum predetermined time, which may be the same as or different from the first time, if, or until, the temperature again exceeds the predetermined level, allows the device to remain operable over a very much longer period before the battery would be discharged to an unacceptable level at which the vehicle, can no longer be started.

The device preferably also incorporates a battery condition monitor whereby operation of the system is halted or prevented if the voltage of the battery unit is, or falls below, below an acceptable level. The battery conditioner monitor is preferably associated with a warning light or other indicator to draw attention to the fact that there may be battery problems.

Monitoring battery condition ensures that operation of the device cannot drain the battery to a level below that needed to start the vehicle. Preferably the battery condition monitor prevents operation of the device when the battery voltage drops to a level that is well above the minimum voltage needed to start the vehicle.

Preferably the device is programmed to allow only a fixed number of cycles of drawing and ceasing to draw power before it shuts off, regardless of the temperature inside the compartment at that time and is reset when the vehicle is restarted using the ignition switch.

The control means may employ analog or, more preferably, digital processing techniques for the temperature comparator and battery monitoring functions of the device.

The device of the invention will also normally include a display board or display module which houses the temperature sensor, an on/off switch and an indicator light, preferably an LED, for indicating battery condition.

The display board or module is preferably designed to be mounted unobtrusively on the dashboard of the vehicle with the control means being housed in a module that can be mounted beneath the dashboard.

The invention thus provides a purely electronic solution to the problem of passenger compartment overheating by "piggy-backing" onto existing components of the vehicle. Moreover, by causing cooler outside air to circulate through the air conditioner ducting, not so much heat will be present in the ducting when the air-conditioner system is subsequently turned on since the air-conditioner evaporator coils will be kept cool by the circulated air. In addition, the humidity of the passenger compartment will tend to equilibrated with the humidity outside the vehicle thus reducing damage to vehicle components and other artifacts that are prone to damage by moisture.

The use of the device also produces a deodorizing effect by ensuring that the odours from odiferous vapours are swept out of the vehicle, even when it is parked, and that any odiferous materials that have been accidentally transferred into the vehicle, for example on the shoes of the occupants, and have ceased to smell when they dry do not start to smell again if they are re-moistened by a build-up of humidity in the vehicle.

DESCRIPTION OF PREFERRED EMBODIMENTS

The invention will now be described in greater detail, by way of example, with reference to the accompanying drawings in which FIG. 1 is a general flow chart showing the sequence of operations for an automatic vehicle ventilation system incorporating the device of the invention;

Figure 1:
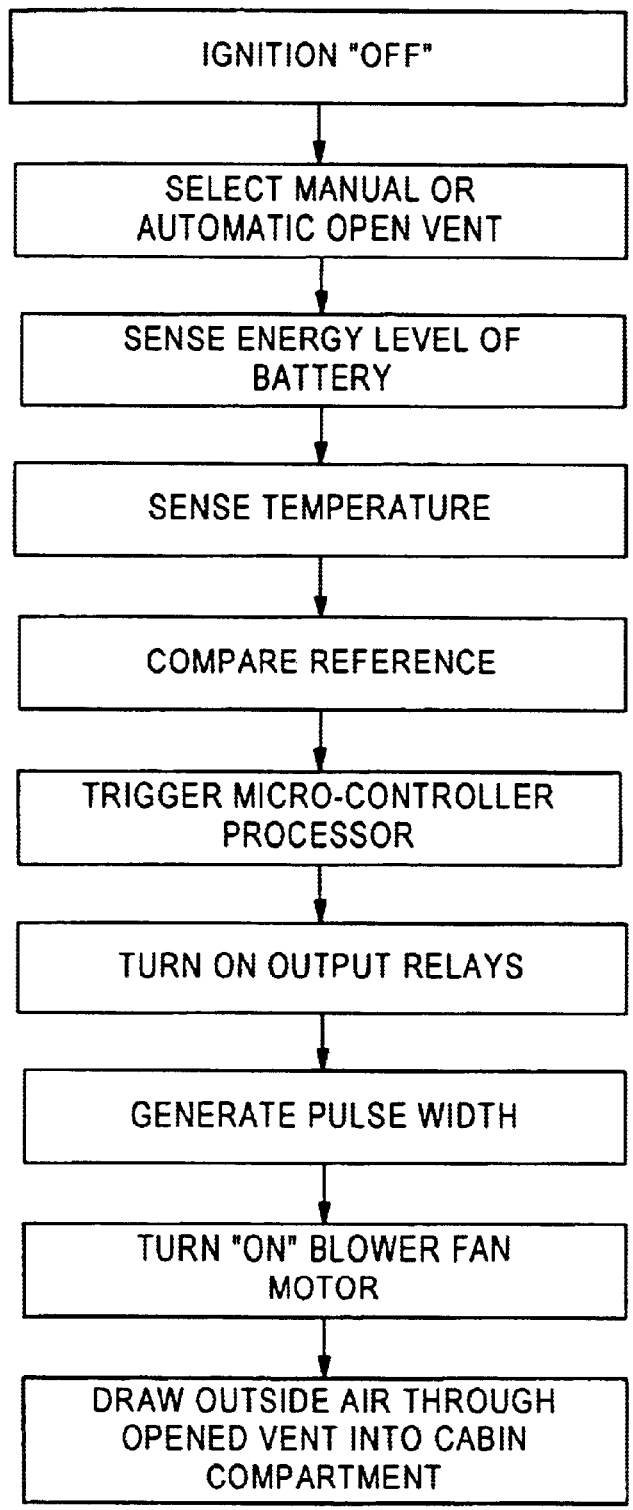
Figure 2:
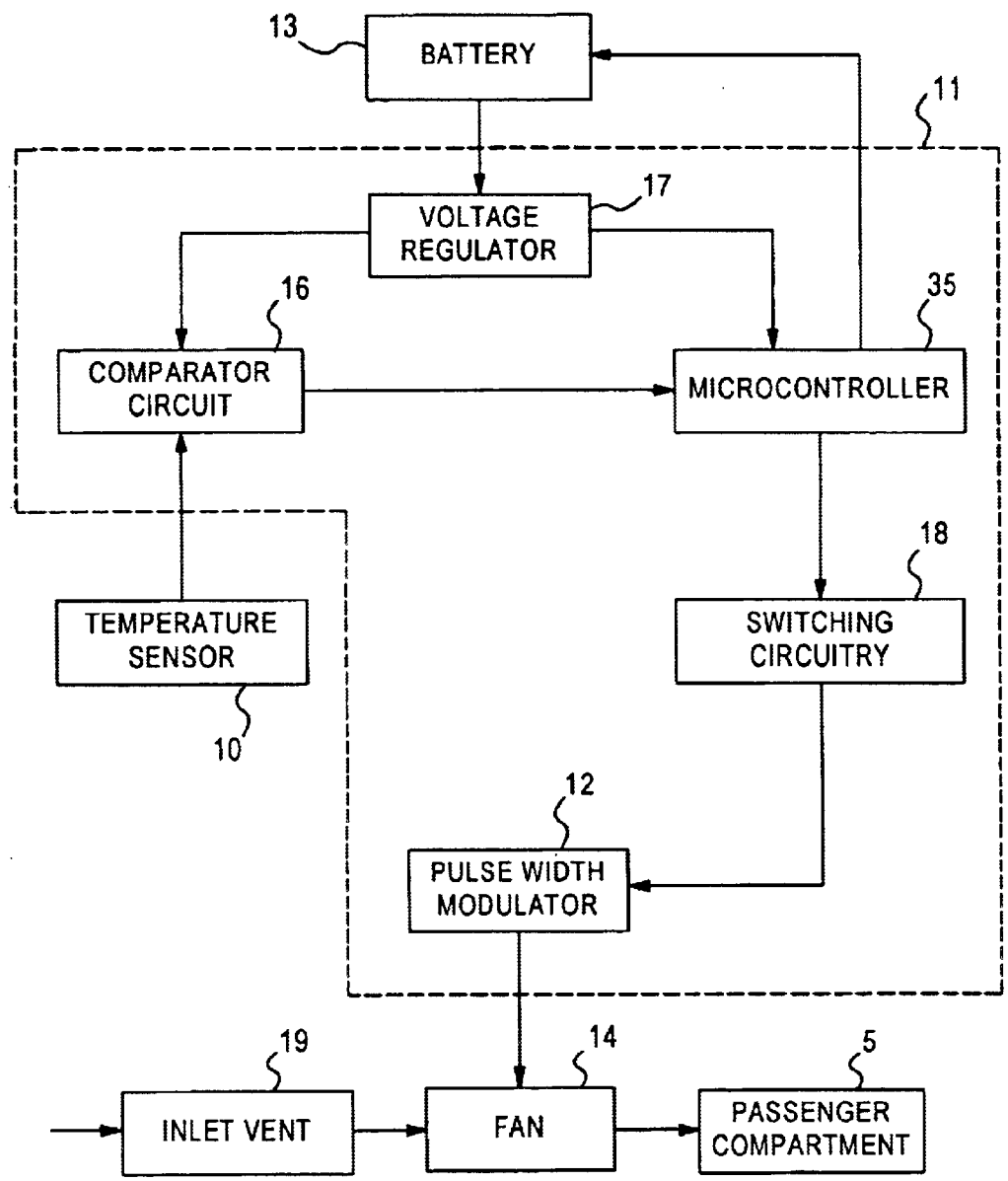
FIG. 2 is a block diagram of one form of the system.

As shown in FIGS. 1 and 2, the system of the invention comprises a temperature sensor or thermistor 10 electrically connected in conventional manner to a comparator circuit 16 in a control means 11. The sensor 10 is disposed within the passenger compartment 5 of a vehicle. The control means also includes a linear voltage regulator 17 for receiving power from a 12 volt battery 13 of the vehicle and converting it to 5 volts, a micro-controller 35, power switching circuitry 18 and a pulse width modulator 12. In the control means, voltage regulator 17 is connected to both comparator 16 and micro-controller 35. Micro-controller 35 is connected to pulse width modulator 12 via switching circuitry 18 and also to the battery 13 by battery condition and/or voltage drop monitoring means (not shown). The pulse width modulator 12 is electrically connected to the existing air conditioner fan motor assembly 14 of the vehicle. Installation of the device and use of the system in no way affects the existing electrical arrangements of the vehicle since the system complements and "piggy backs" on the existing electrical system and is operable only when the other systems are switched off. Normal running of the air-conditioning system is not affected because a relay that automatically disconnects the fan speed controller 59 when the system is operating, operate to reconnects fan speed controller 59 when the system is not operating.

As shown in FIG. 1, in operation of the system, when the ignition switch of the vehicle is switched off and the inlet vent or vents to the air conditioner are opened manually or automatically. The device is automatically switched on and the level of the battery is sensed. The temperature inside the vehicle is also sensed and compared to the reference temperature. If the battery level is satisfactory, when the temperature inside the vehicle rises above the reference temperature, the comparator 16 generates a signal that triggers the micro-controller 35 to switch output relays and operate pulse width modulator 12. This causes the air conditioner fan 14 to operate and draw air from the outside through the open inlet vent 19 into the passenger compartment. The warm air inside the compartment is driven out past the window and door seals and other places that are not completely airtight. After a set period determined by pulse width modulator 12 the output relays are deactivated, power is no longer drawn from the battery 13, and the fan 14 ceases to operate. After a second set period also determined by pulse width modulator 12, if the temperature in the vehicle is still below the reference temperature nothing happens but the temperature sensor 10 continues to sense the temperature inside the vehicle until it rises above the reference temperature. If the temperature is above the reference temperature, or when it again rises above the reference temperature, the device again cuts in to operate fan for a further period.

Micro-controller 35 is set to operate the fan 14 for a certain period, typically about 60 to 120 seconds. Such sequence of temperature measurement, comparison and fan actuation is repeated as necessary. However, it is generally preferred that the sequences are limited to a maximum of, say, 240 times in one operational cycle until the system is re-set again to avoid battery depletion The system will be re-set again if the ignition switch of the vehicle is turned to its on position, for example during the starting and running of the vehicle when the battery 13 will be recharged. In addition, it is also preferred that the device can only be operated for a maximum of 8 hours in one operational cycle. This feature caters for the possibility of the vehicle being idle for longer periods than normal, for example, while the owner is away from home.

The efficiency of the system may be increased even further if the existing ventilation ducting mechanism of the vehicle is also put to use.

Figure 3:
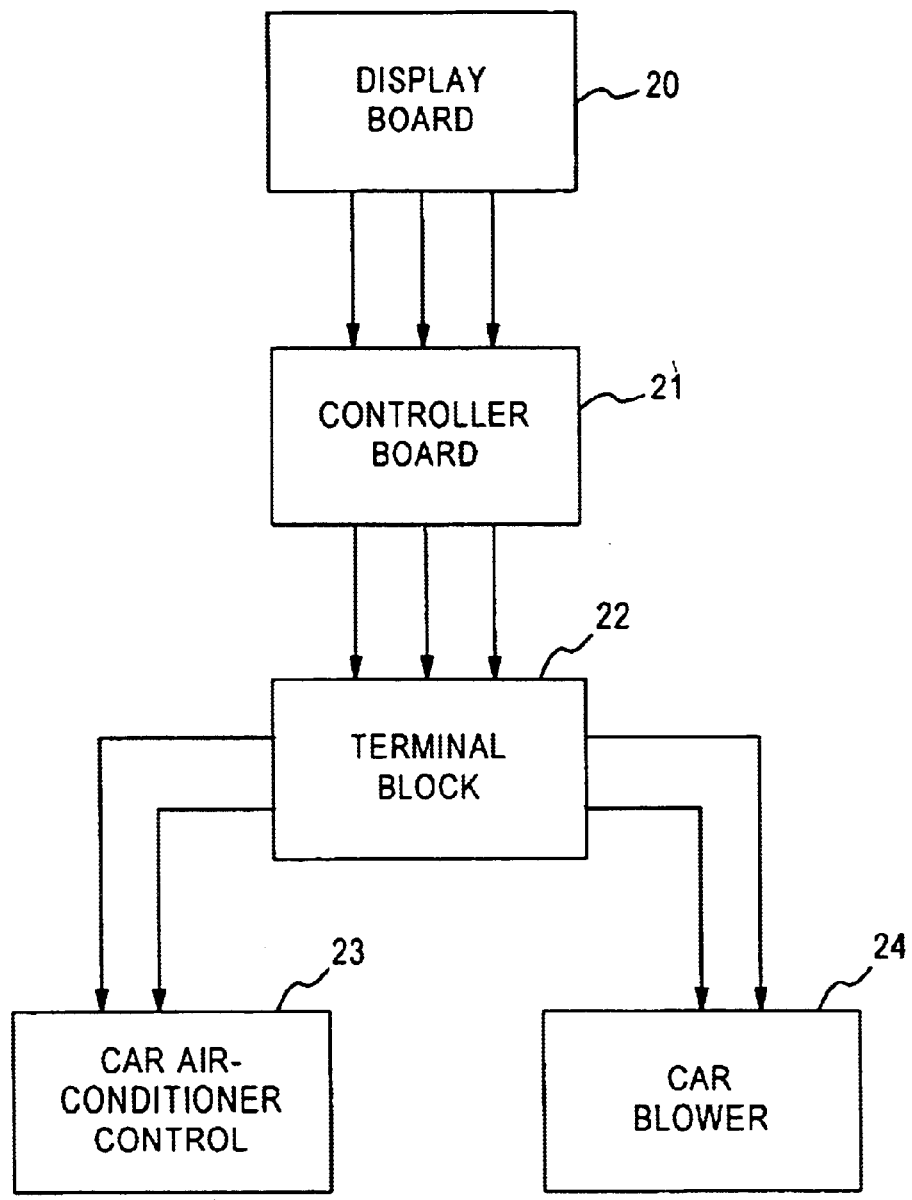
FIG. 3 is a connection block diagram of the system of FIG. 2.

FIG. 3 shows the connection block diagram of the invention. The system is generally adapted to be assembled in three different modules, i.e., a display board 20, a control module 21 and a terminal block 22. The terminal block 22 suitably consists of a 16 Amp, 2-pole terminal for allowing the device to be connected to the existing fan and the air-conditioner control wiring system. As mentioned earlier, the proposed system is intended to "piggy-back" on the existing system and the terminal block allows such connection to be made with ease. The control module 21 encloses the linear regulator 17, the comparator circuit 16, micro-controller 35, power switching circuitry 18 and the power supply management means 12. Thus, the control module 21 encloses the components of the control means 11, The display means houses the temperature sensor 10, an on/off switch 56 and an indicating light or LED 57 along with a biasing resistor 58. The display means is intended to be mounted on the dashboard of the vehicle using suitable means and the control module 21 may be concealed from view, usually underneath the dashboard. The connections to the battery and ignition system of the vehicle are made on the control module along with suitable grounding.

Figure 4A:
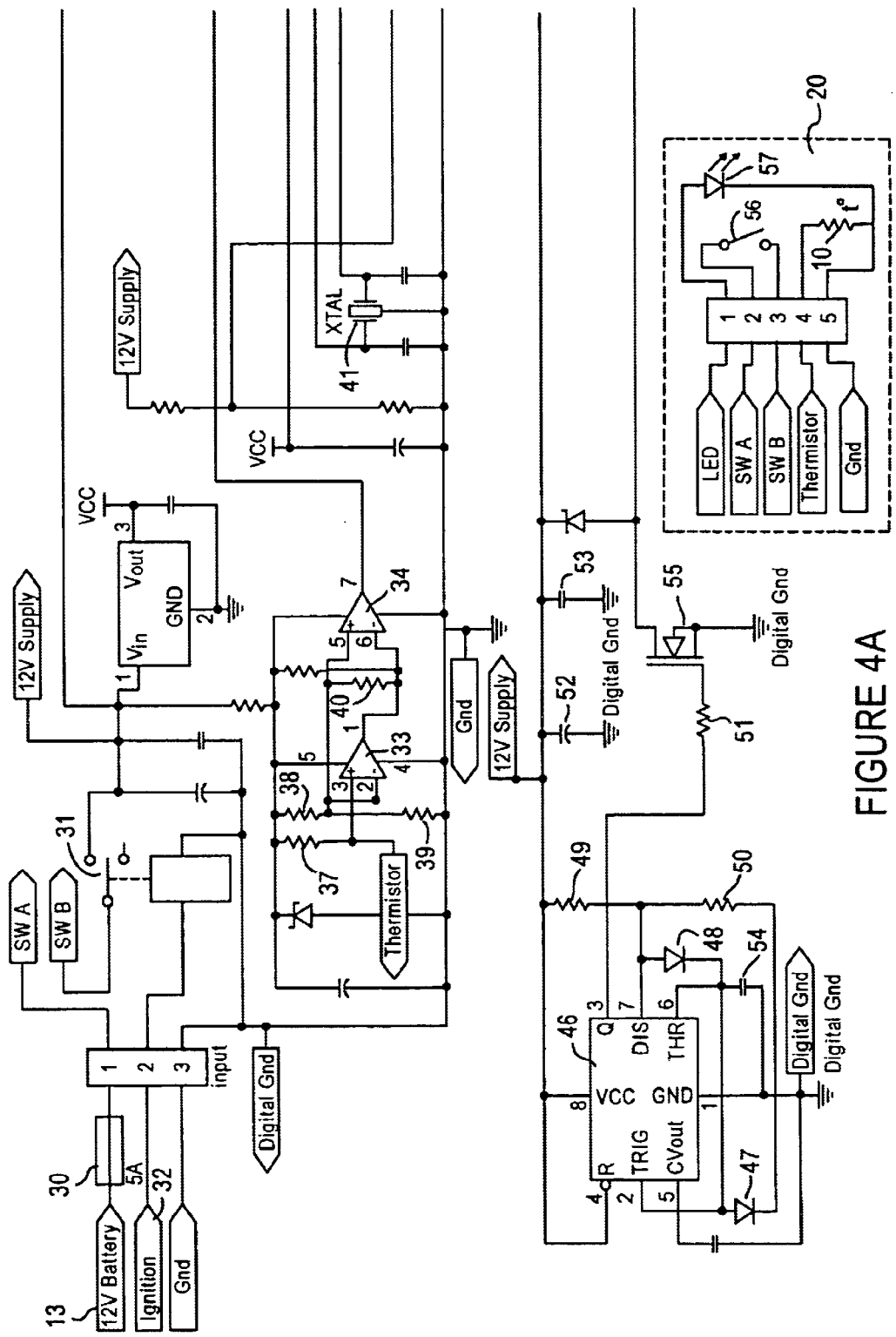
FIG. 4 is a circuit diagram of a first embodiment of the device.
Figure 4B:
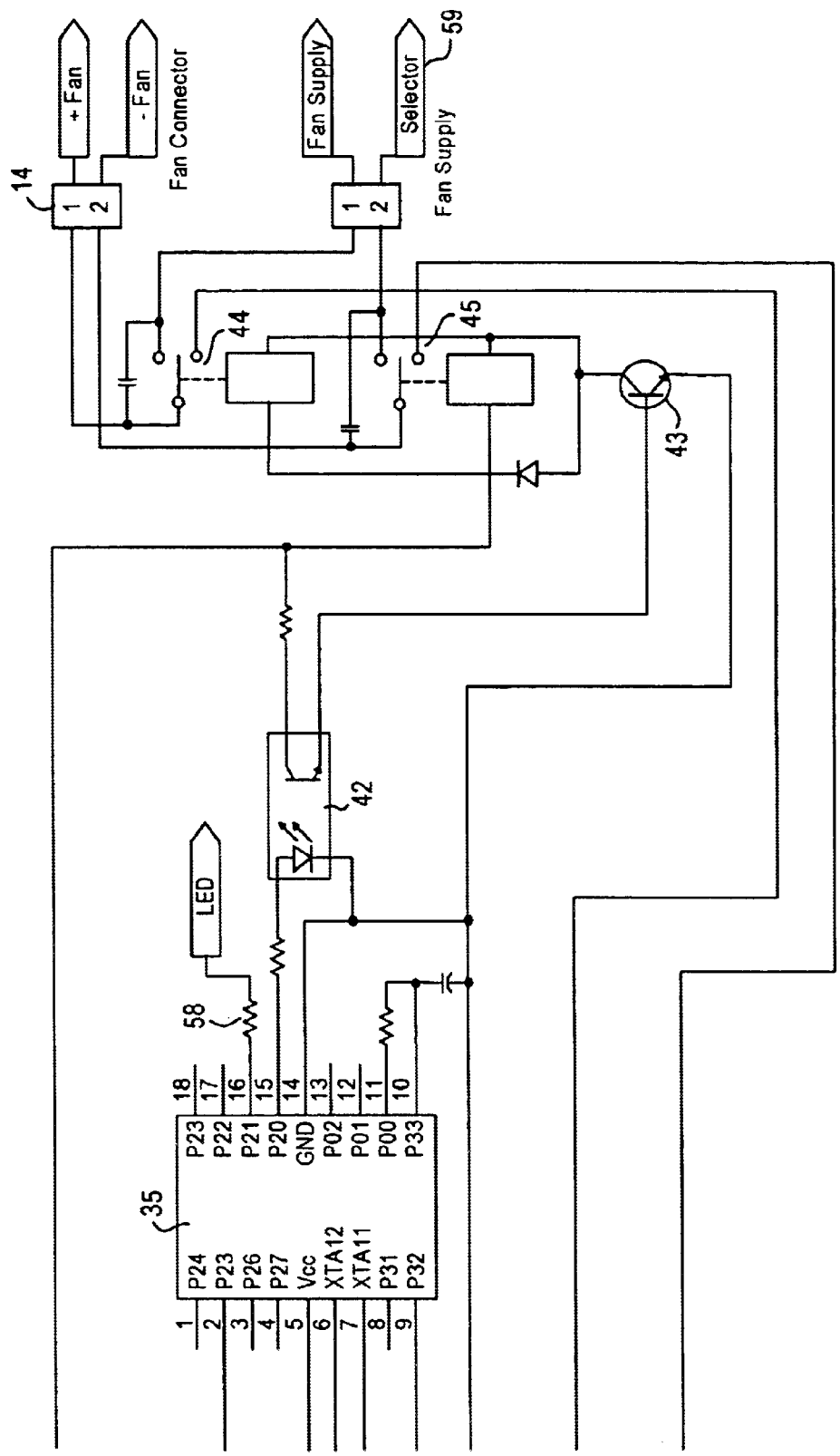

Referring now to FIG. 4, there is shown a circuit diagram of an analog version of the device of the invention. A fast blow fuse 30 is connected to the incoming +12 Volts supply from the vehicle battery 13. A relay 31 is employed to turn on the system when the ignition switch 32 of the vehicle is turned to its off position. A step-down +5 volt linear regulation method is used to develop a circuit that supplies power to operational amplifiers 33, 34 and the micro-controller 35. A thermistor 10 is placed in series with a resistor 37 at the non-inverting input of the operational amplifier and a reference of 4.1 Volts is obtained using resistors 38, 39 and the operational amplifier 33. A low state trigger output is produced at the output of the operational amplifier 33 if the non-inverting input voltage is less than the reference voltage. The output of operational amplifier 34 is produced at high trigger once the low state trigger at the inverting of operational amplifier 34 is compared with a reference of 4.1 Volts at the non-inverting input of operational amplifier 34. A resistor 40 is connected between the differential input of operational amplifier 34 to avoid virtual ground effect while in the comparing state.

Micro-controller 35 is employed as task monitoring and control unit for the control means 11. Pins (6) and (7) of the micro-controller 35 are connected to a crystal oscillator 41. The comparison trigger output of operational amplifier 34 is fed into pin (2) of the micro-controller. Upon receiving the comparison trigger input, the micro-controller 35 cycles through the embedded software and sends out an output signal through pin (15) of the micro-controller, which is connected to an opto-coupler 42 to drive transistor 43. Following this, the collector current energizes and turns on output relay 44 that is connected to the fan motor 14. Relay 45 disconnects fan speed controller 59. The pulse width modulation to energize the fan motor 14 is accomplished through use of a 555 timer 46 with its associated components, diodes 47, 48, resistors 49, 50, 51 and capacitors 52, 53, 54, generating a continuous pulse with a duty cycle of 48.8% that switches directly through gate resistance 51 to a MOSFET transistor 55 This switching network is utilized to control current drain from the battery 13 and since energy is drawn as pulses, usage of energy from the battery is minimized. This is particularly due to the non-direct connection of the battery terminals to the fan motor 14. Pin (9) is employed to detect low battery condition, If for any reason voltage at the battery terminal should fall below 11.9 volts, the system will not be allowed to operate. LED 57 will be lit to indicate such condition. A blinking LED is especially preferred.

Figure 5A:
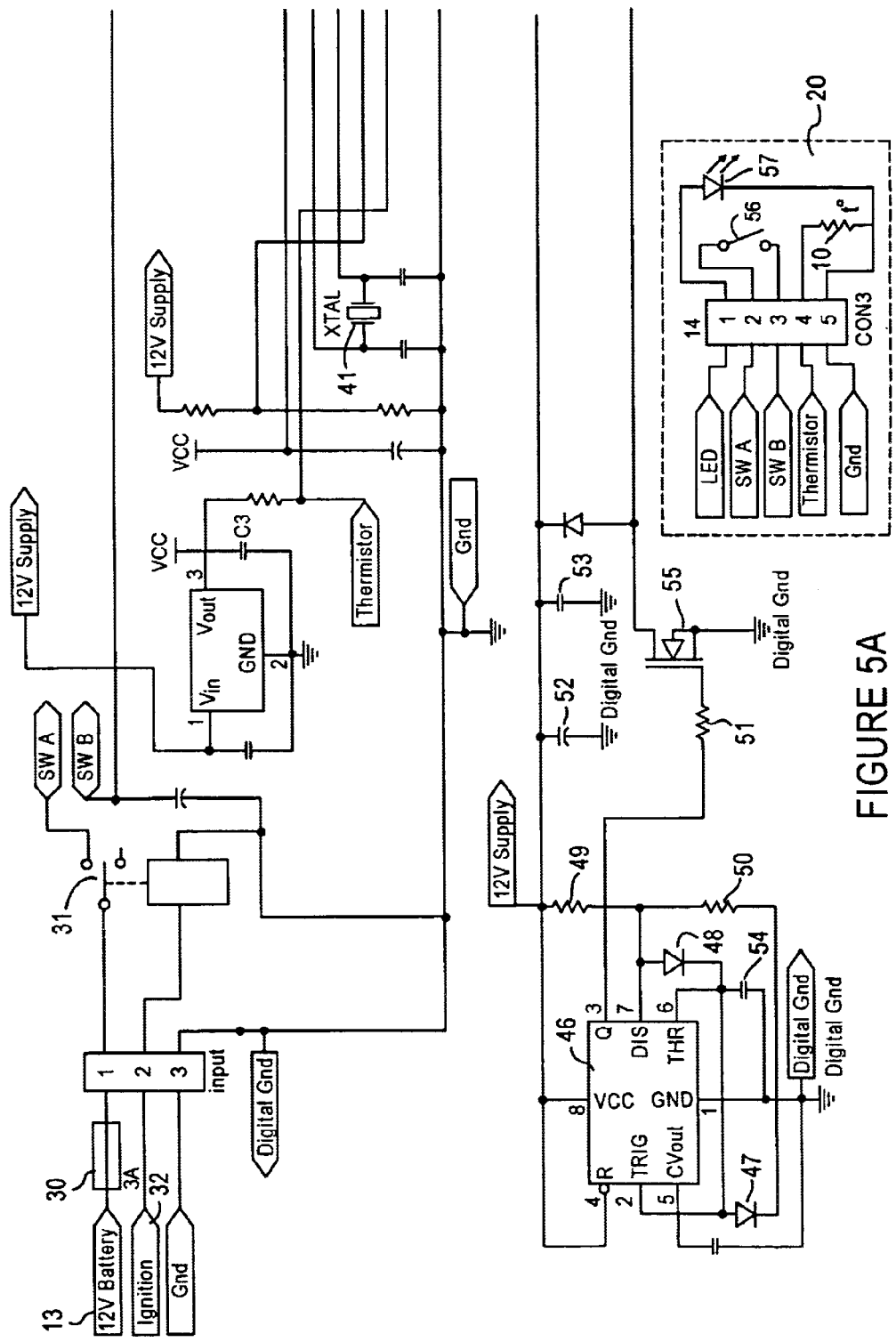
FIG. 5 is a circuit diagram of a second embodiment of the device.
Figure 5B:
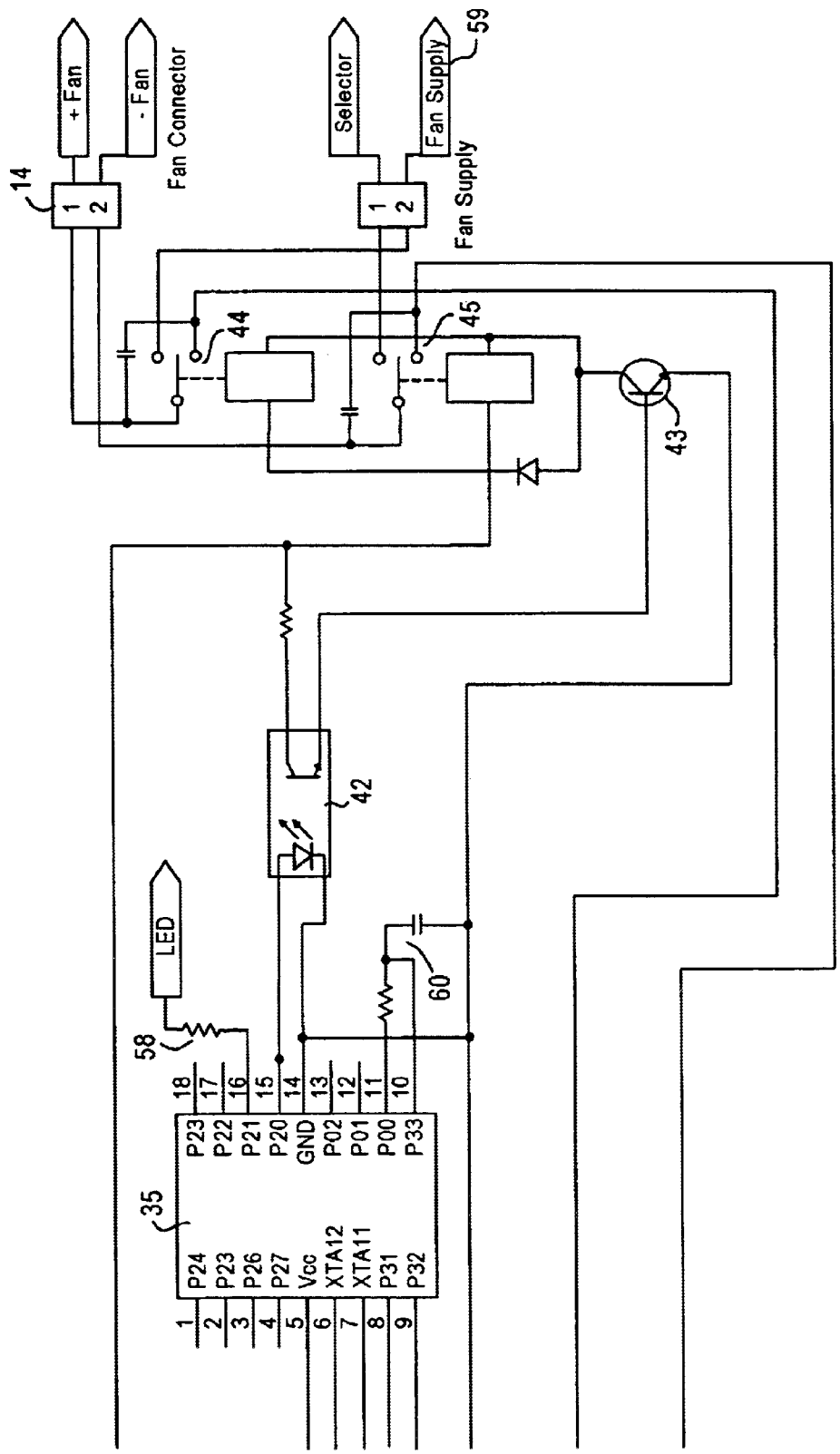

FIG. 5 shows a digital version of the comparator circuit 16. This embodiment adopts a much simpler solution by removing the operational amplifiers 33, 34 as used in the external comparator shown in FIG. 4. In this embodiment the device incorporates a built-in comparator within the micro-controller 35. A number of micro-controllers having such built-in comparators may be found in the market. The micro-controller 35 coupled with the pulse width modulated ramp and the timer is used to implement a single-slope AC/DC conversion to detect the unknown input voltages from the themistor. The input voltage is then read by software in the micro-controller as a digital representation. The output is fed into an RC integrator 60, which produces a linear ramp. The analog voltages generated from the thermistor 10 are inputted to pin (9) of the micro-controller. Typically, voltages at these inputs will range between 0 and 5 Volts. When input analog voltage exceeds the pre-determined set level voltage in the software, an interrupt signal in the micro-controller is generated and the blower fan motor will operate as in the device of FIG. 4. Such a digital technique is generally more preferred since the number of components in the device is reduced. Moreover maintenance work and adjustment may be made through the software with relative ease.

As in the analog circuit shown in FIG. 4, low battery voltage detection is also employed. However, in this arrangement, pin (8) of the micro-controller 35 is used for this purpose.

I claim:

1. A device for avoiding overheating in a passenger compartment of a parked vehicle, said device comprising a temperature sensor, a temperature comparator and a control element in electrical communication with the comparator for controlling the actuation and operation of an existing air conditioner fan of the vehicle;

the control element comprising a power supply management element adapted to draw energy in pulses from a battery unit of the vehicle to energize the fan when the temperature in the passenger compartment exceeds a pre-determined level, and to cease drawing energy from the battery unit when the temperature falls below the predetermined level;

wherein said power supply management element is a pulse width modulator having a pulse frequency set above the audible frequency range and below the RE frequency range so as to avoid human discomfort and to avoid possible frequency-related interference with electronic components of the vehicle.

2. A device as claimed in claim 1, wherein the control element is micro-processor based.

3. A device as claimed in claim 1, which is enabled only when an ignition switch of the vehicle is turned to its off position.

4. A device as claimed in claim 1, which further incorporates a switch that operates automatically to switch on the device when the ignition of the vehicle is turned off.

5. A device as claimed in claim 1, which makes use of existing ventilation ducting elements in the vehicle.

6. A device as claimed in claim 1, wherein the control element includes a battery monitor that causes the device to cease to operate when the battery voltage falls below a predetermined level.

7. A device as claimed in claim 6, which includes a light indicator that is lit when the battery voltage falls below said predetermined level.

8. The device of claim 1, wherein said pulse width modulator has a pulse frequency of about 24 kHz.

9. A device for avoiding overheating of a passenger compartment of a parked vehicle, said device comprising a temperature sensor, a temperature comparator and a control element in electrical communication with the comparator for controlling the actuation and operation of an existing air conditioner fan of the vehicle;

the control element comprising a power supply management element adapted to draw energy in pulses from a battery unit of the vehicle to energize the fan when the temperature in the passenger compartment exceeds a pre-determined level, and to cease drawing energy from the battery unit when the temperature falls below the predetermined level;

wherein power supply management element employs a pulse width modulation technique to control energy usage from the battery unit.

10. The device of claim 9, wherein said power supply management element is a pulse width modulator and the pulses of energy are supplied by the pulse width modulator to the fan only for a pre-determined period.

11. The device as claimed in claim 10, wherein the predetermined period is about sixty seconds; and when the predetermined period has lapsed, the pulse width modulator discontinues the energy supply to said fan for a further predetermined period and resumes the energy supply to said fan again only if the passenger compartment temperature still exceeds the predetermined level, or when the passenger compartment temperature exceeds the predetermined level again.

12. The device as claimed in claim 10, wherein the control element limits the number of actuation sequences of the fan to a pre-determined maximum within one operational cycle of the device.

13. The device as claimed in claim 12, wherein the pre-determined maximum number of actuation sequences is set at about 240 within a maximum of eight hours for each operational cycle.

14. The device as claimed in claim 12, arranged to be re-set to start a new operational cycle when the ignition switch of the vehicle is turned to its on position.

15. A device for avoiding overheating of a passenger compartment of a parked vehicle, said device comprising a temperature sensor, a temperature comparator and a control element in electrical communication with the comparator for controlling the actuation and operation of an existing air conditioner fan of the vehicle;

the control element comprising a power supply management element adapted to draw energy in pulses from a battery unit of the vehicle to energize the fan when the temperature in the passenger compartment exceeds a pre-determined level, and to cease drawing energy from the battery unit when the temperature falls below the predetermined level;

wherein the pulses of energy are supplied by the power supply management element to energize the fan only for a pre-determined period.

16. A device as claimed in claim 15 wherein the predetermined period is about sixty seconds; and when the predetermined period has lapsed, the power supply management element discontinues the energy supply to said fan for a further predetermined period and resumes the energy supply to said fan gain only if the passenger compartment temperature still exceeds the pre-determined level, or when the passenger compartment temperature exceeds the predetermined level again.

17. The device of claim 16, wherein the power supply management element supplies energy to said fan only for the pre-determined period, after that said power supply management element discontinues the energy supply to said fan regardless of whether the passenger compartment temperature still exceeds the predetermined level or not.

18. A device as claimed in claim 15, wherein the control element limits the number of actuation sequences of the fan to a pre-determined maximum within one operational cycle of the device.

19. A device as claimed in claim 18, wherein the pre-determined maximum number of actuation sequences is set at about 240 within a maximum of eight hours for each operational cycle.

20. A device as claimed in claim 18, arranged to be re-set to start a new operational cycle when the ignition switch of the vehicle is turned to its on position.

* * * * *